United States Patent
Stoddard et al.

(10) Patent No.: US 7,349,457 B2
(45) Date of Patent: Mar. 25, 2008

(54) BROADBAND FREQUENCY AGILE SIGNAL CHARACTERIZATION

(75) Inventors: Robert Eugene Stoddard, Sunnyvale, CA (US); Michael Shaw McKinley, Sunnyvale, CA (US)

(73) Assignee: Aeroflex Powel, Inc., Powell, OH (US)

( * ) Notice: Subject to any disclaimer, the term of this patent is extended or adjusted under 35 U.S.C. 154(b) by 749 days.

(21) Appl. No.: 10/812,226

(22) Filed: Mar. 29, 2004

(65) Prior Publication Data

US 2005/0227626 A1    Oct. 13, 2005

(51) Int. Cl.
*H04B 1/69* (2006.01)
*H04B 17/00* (2006.01)

(52) U.S. Cl. .................. 375/131; 375/224
(58) Field of Classification Search ............ 375/131, 375/132–138, 224–228, 346, 350
See application file for complete search history.

(56) References Cited

U.S. PATENT DOCUMENTS

| 6,061,389 | A * | 5/2000 | Ishifuji et al. ............ 375/133 |
| 6,195,383 | B1 | 2/2001 | Wishart et al. |
| 7,075,948 | B2 * | 7/2006 | Makarov .................. 370/503 |
| 2001/0022806 | A1 * | 9/2001 | Adachi .................... 375/133 |
| 2003/0103589 | A1 * | 6/2003 | Nohara et al. ............ 375/350 |
| 2005/0215208 | A1 * | 9/2005 | Stoddard et al. ......... 455/115.2 |

OTHER PUBLICATIONS

Aeroflex, Frequency Agile RCTS-001 Radio Test System, 2 pages Web Published at least as early as Mar. 7, 2004, First Publication Date Unknown.
Agilent Technologies E1852B Bluetooth Test Set, pp. 1-4 Web Published at least as early as Mar. 7, 2004, First Publication Date Unknown.
Agilent 89441A, Vector Signal Analyzer, dc to 2.65 GHz, pp. 1-20 Web Published at least as early as Mar. 7, 2004, First Publication Date Unknown.
Rohde&Schwarz, Tektronix, Universal Radio Communication Tester MU200 pp. 1-40 Web Published at least as early as Mar. 7, 2004, First Publication Date Unknown.
Rohde&Schwarz, Tektronix, Bluetooth™ measurements in CMU200, pp. 24-27 Web Published at least as early as Mar. 7, 2004, First Publication Date Unknown.

* cited by examiner

*Primary Examiner*—Don N. Vo
(74) *Attorney, Agent, or Firm*—David E. Lovejoy

(57) ABSTRACT

A signal analyzer to characterize the RF signal transmitted by a frequency hopping radio transmitter. The transmitted signal is analyzed while hopping across a broad frequency band without knowledge of the hop frequencies, timing or signal bandwidth. A wide range of signal parameters are measured on the dehopped signal to characterize the radio performance and the compliance to the radio specifications.

2 Claims, 7 Drawing Sheets

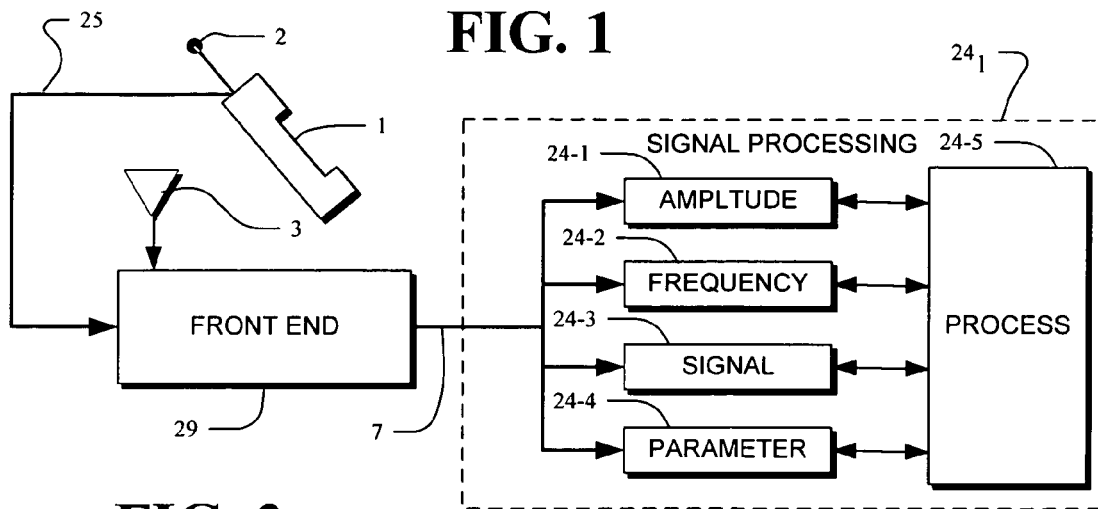
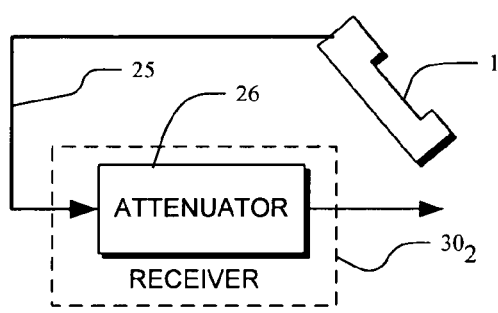
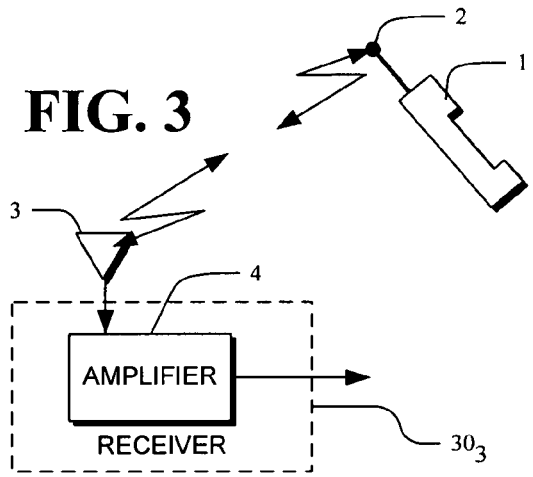
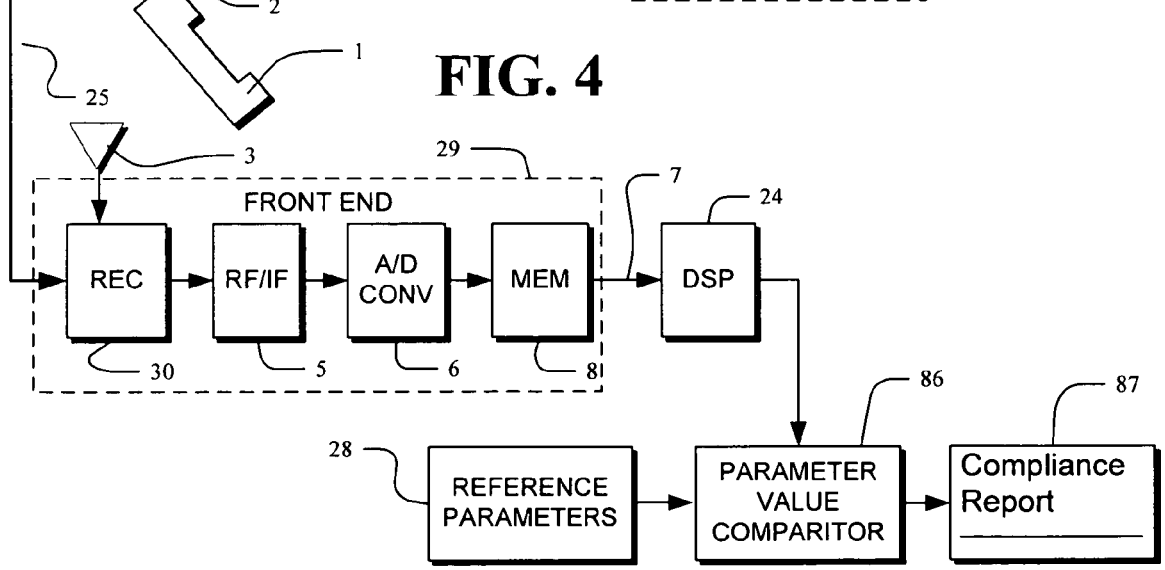

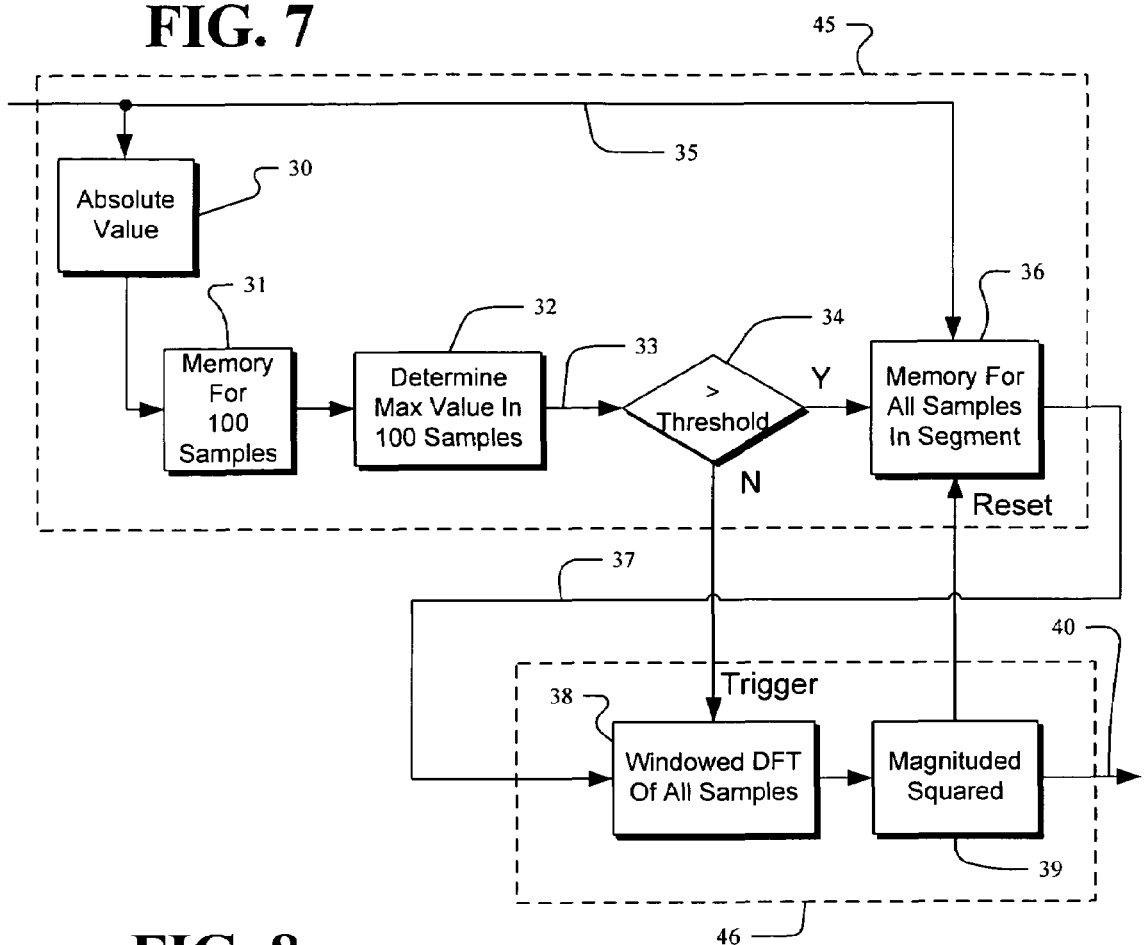
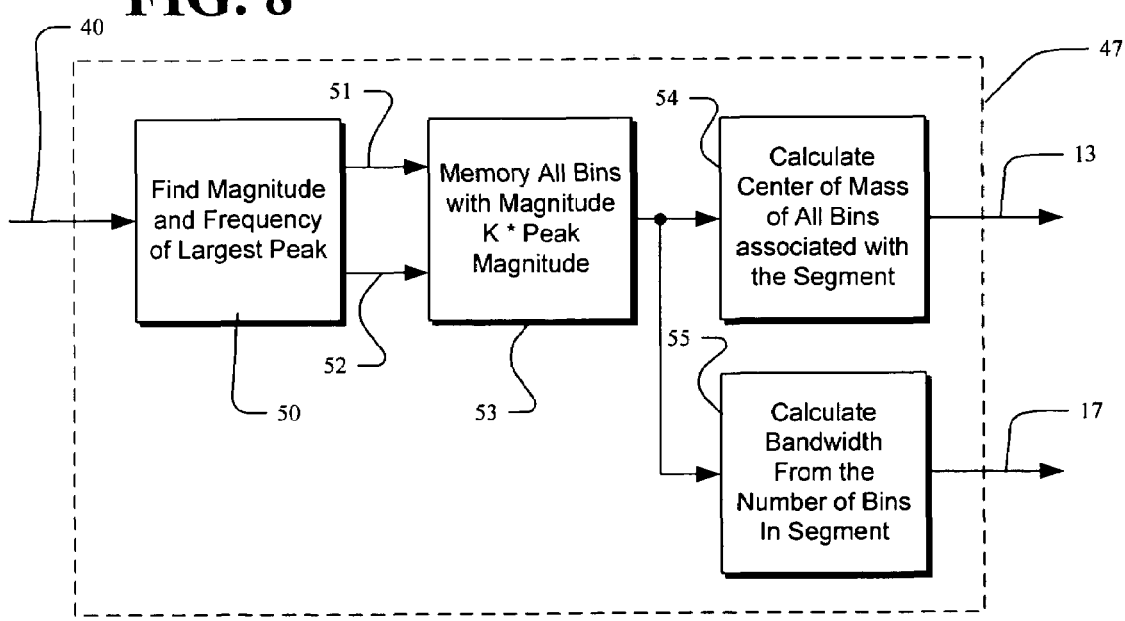

BROADBAND FREQUENCY AGILE SIGNAL CHARACTERIZATION

BACKGROUND OF THE INVENTION

The present invention relates to methods and apparatus for broadband frequency characterization of radio wave signals and particularly for broadband frequency characterization of frequency hopping radio wave signals.

Frequency hopping is a form of spread-spectrum signaling where, for short instances of time, relatively narrowband signals are transmitted as short bursts with the carrier frequency for each burst tuned to a different one of a set of carrier frequencies than the ones of the carrier frequencies used for the previous burst and the next burst. The sequence of frequencies that is used for a sequence of bursts is known as the hopping sequence. The carrier frequency transmission at any particular instant of time for one burst is therefore different than the carrier frequency transmission at the previous instant of time for the previous burst and similarly is different than the carrier frequency transmission at the next instant of time for the next burst. While the bandwidth for any particular burst may be narrow, the bandwidth for the whole set of frequencies in the hopping sequence can be very large. Typically a frequency hop system hops over a bandwidth many times the bandwidth of the individual hop signal bandwidth. Bluetooth for example has a 1 MHz signal bandwidth and hops over 80 MHz. Some military radios have 25 kHz signal bandwidth with thousands of hop frequencies covering over 50 MHz. The frequency hoppers in use today hop over at least 8 times the bandwidth of the signal bandwidth.

Frequency hopping systems with changing frequency transmissions have a number of advantages over the fixed frequency transmissions of non-hopping systems. If a particular hop frequency, in the set of frequencies used in a hopping sequence, happens to include a frequency that is regularly occupied by another interfering radio signal, the frequency hopping system detects the occupied status and functions to retransmit the burst of data at a different frequency. Also, the frequency hopping system detects the regularly occupied frequencies for any particular installation and reestablishes a hopping sequence that excludes the occupied frequency from the set of frequencies in the hopping sequence.

Frequency hopping systems are more secure than fixed frequency systems because the interception of frequency hopped signals is significantly more difficult than interception of fixed frequency signals, particularly when the hopping sequence is not known in advance. If a communication protocol is intended to be secure, such as in military and other secure environments, the hopping sequence and other protocol, specification and standards information is not published and is changed from time to time to support secure operation.

In any environment, the characterization of radios and radio wave signals for frequency hopped systems is difficult because they operate and function over broad bandwidths and because each burst at a particular frequency is of relatively short duration. The characterization of signals for frequency hopped systems is even more difficult when done in a secret environment where the protocol, specification, standards, hopping sequence and other characterizing information is not fully known in advance. A secret environment is common since manufacturers and users of frequency hopping systems often wish to maintain their protocols, specifications, standards and hopping sequences confidential and unpublished.

In order to avoid the difficulties of characterizing frequency hopped systems, some analysis systems require the test radio to be put in a "hop-in-place" mode where the carrier frequency is the same for all bursts, that is, the frequency does not hop. Such "hop-in-place" systems eliminate the burden of dehopping the signal so that the analysis is much easier. However, such systems do not fully test the parameters that relate to or are affected by hopping and hence cannot fully characterize frequency hopping radios. Examples of such "hop-in-place" systems are the Agilent 89441A system with the Bluetooth® module and the Aeroflex RCTS-001 Radio Test Set.

In order to avoid the difficulties of characterizing frequency hopped systems when frequencies actually hop, some analysis systems require that the next hop in a hopping sequence for the test radio be known in advance by the analysis system. When the next hop in a hopping sequence is known in advance, such systems synchronize the frequency hopping of the analysis system with the frequency hopping of the test radio. In order to know the next hop in a hopping sequence in advance, analysis systems use the tuning information present in the radio signal messages of the test radio to derive each next hop frequency in the hopping sequence. Therefore, the next hop frequency is known in the analysis system before the hop actually occurs. Using the information from the radio signal messages, the analysis system synchronizes with the radio signal. In this manner, the frequency of the analysis system's local oscillator (LO) follows the hopping sequence in advance and thus can be used to dehop the radio signal being analyzed. In order for such systems to work, analysis systems are built to fully implement the radio signal protocols, specifications and standards, including the hopping sequence, for each radio to be analyzed. Such systems are expensive to build because many different radio signal protocols and standards exist. Further, such systems can only be used by those having full access to the signal protocols and standards including the hopping sequences. For many radio systems, however, for security and other reasons, such information is often not widely available. Examples of analysis systems that employ prior knowledge of the hops in a hopping sequence are the Agilent E1852B and Tektronix CMU 200 systems and the Marconi system (see U.S. Pat. No. 6,195,383). These Agilent and Tektronix test systems are designed to test the frequency hopping Bluetooth networks. They have internal Bluetooth modules that allow the test systems to become part of the network. These internal modules produce the carrier frequency values as they communicate with the radio under test external to the test system.

Because the "hop-in-place" analysis systems provide limited information, they are not fully adequate for the communication industry. Because the "known-in-advance" analysis systems have cost disadvantages and do not perform well for analyzing radios that are not operating within the specification range for the protocols and standards, they are not fully adequate for the communication industry.

Accordingly, in order to meet the demands of the communication industry, improved methods and apparatus are needed for analyzing frequency hopping signals, and other broadband signals, when the hopping sequences and other signal protocols and standards are not relied upon prior to analysis.

SUMMARY

The present invention is a method and apparatus for broadband radio frequency analysis. The analysis is performed by receiving an input signal from a device under test; determining the start and stop of segments of the signal; and for each segment, processing the segment to determine the frequency of the segment and processing the segment to determine signal parameters of the signal. Typically, the device under test is a frequency hopping radio and the segments are instances of the signal at hop frequencies of the radio.

The present system analyzes frequency hopped signals without requiring prior knowledge of the transmitter specifications and the protocols and standards used for messaging and otherwise used for controlling the radio communication. One of the advantages of the present system is that it is robust in analyzing radios that are not operating within their specifications. The capability of the present system to analyze unknown signals without need for knowledge of the radio specification is important in research and in the development of new radios. It is also useful for analyzing radios that are operating poorly.

Another advantage of present system is that it can be used to analyze unknown signals.

Another advantage of the present system is that it is able to analyze signals in the presence of interfering signals including other interfering signals of the same type.

The present system receives the input signal to be analyzed in a receiver. The receiver in one embodiment receives the input signal through a receiving antenna that receives a signal transmitted through the air interface by a radio. Alternatively, the receiver in another embodiment receives the input signal through a direct-wired connection to a wired-output of the radio thereby bypassing the air interface. In any case, the receiver signal is a radiofrequency signal. The radio input signal from the receiver is down converted, when necessary, and digitized to form a digitized signal. The digitized signal is processed and is determined to be active when energy at a sufficient level is present. When the processed signal is active, the analysis system determines the frequency and bandwidth of the processed signal. The frequency and bandwidth information is used to down convert, filter and decimate the processed signal to form a converted signal. The converted signal is demodulated and analyzed.

In the case of Bluetooth and many military radios, the demodulation consists of AM/ASK and FM/FSK demodulation. Signal parameters are measured on the demodulated signals.

The signal parameters include symbol rate, bit rate, hop duration, hop interval, signal amplitude, frequency offsets, rise/fall times and many others.

Symbols are generated from the demodulated signals. If specification information is known about the signal being analyzed, the bits can be generated from the symbols. For example, if the signal is an FSK signal as in Bluetooth, the frequency states are converted, when desired, directly to raw transmitted bits.

If the specifications of the transmitter are known, the measured parameters can be compared to the specifications to determine if the radio is operating properly in accord with its specification.

The foregoing and other objects, features and advantages of the invention will be apparent from the following detailed description in conjunction with the drawings.

BRIEF DESCRIPTION OF THE DRAWINGS

FIG. 1 shows a high-level functional block diagram of the present system including the radio, a signal capture receiver and signal processing components for analysis.

FIG. 2 shows the radio having a wired connection for receiving the signal.

FIG. 3 shows the radio signal being received by present system via a transmit antenna on the radio and a receive antenna on present system.

FIG. 4 is a hardware diagram of the preferred embodiment.

FIG. 7 shows the digital signal processing used to identify the samples associated with the signal segment and to calculate the power spectrum of the segment.

FIG. 8 shows the digital signal processing used to calculate the carrier frequency and the bandwidth of the segment.

DETAILED DESCRIPTION

Figure 5:
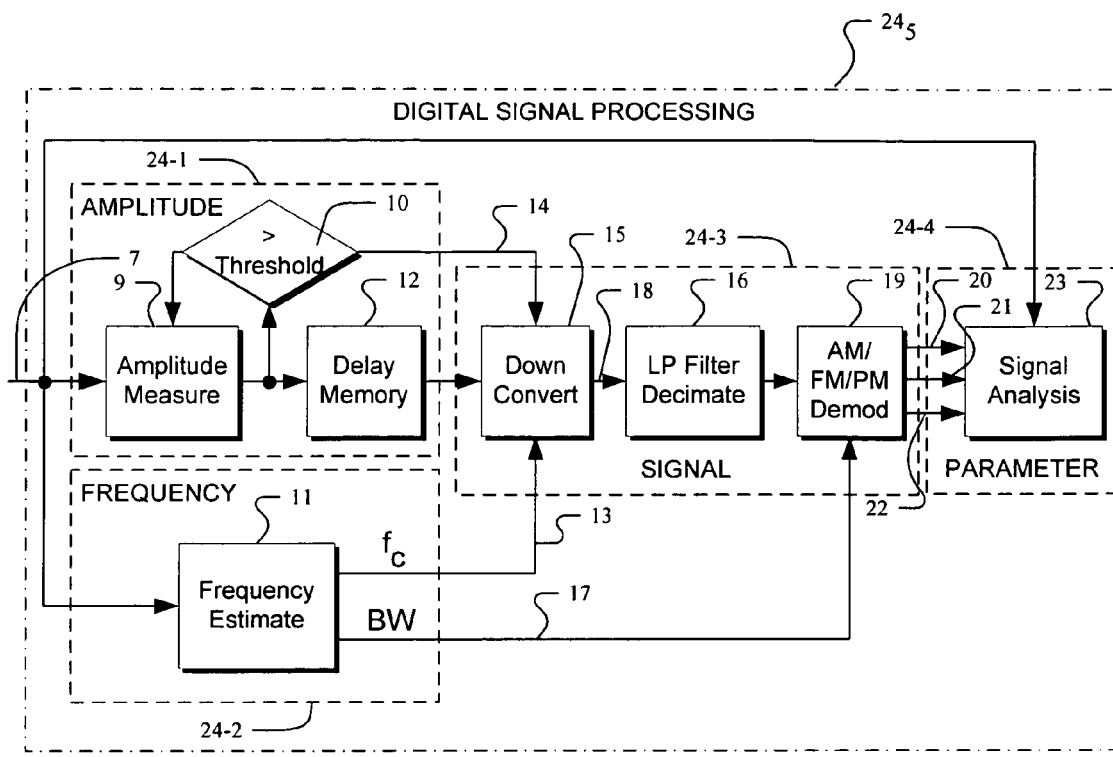
FIG. 5 represents the signal processing steps performed on digitized data to produce signal parameters and demodulated symbols and bits.

In FIG. 1, the radio 1, a device under test, produces a radio frequency input signal which is captured by front end 29 and which is processed by the signal processing components $24_1$. The signal processing components $24_1$ analyze and characterize the input signal from the radio 1. Typically, the radio 1 is a frequency hopping radio that transmits a radio wave signal in segments where each segment is an instance of the signal at one of the hop frequencies of the radio. The broadband analysis performed in FIG. 1 by the signal processing components $24_1$ commences using the AMPLITUDE component 24-1 to determine the start and stop times of each of the segments of the input signal. For each segment identified by the AMPLITUDE component 24-1, the FREQUENCY component 24-2 determines the frequency of the segment. The SIGNAL component 24-3 converts each input segment having an input form to a converted segment having a converted form. The converted form facilitates further processing. An analysis of the converted segment is performed using the PARAMETER component 24-4 to determine signal parameters of each segment individually and to determine signal parameters of multiple segments collectively so as to characterize the input signal.

The analysis performed in FIG. 1 occurs without requiring prior knowledge of the radio specifications, protocols, standards or other similar information about the radio 1. Accordingly, the FIG. 1 analysis is particularly suitable for analyzing radios that are not operating within their specifications or that are otherwise operating poorly, for analyzing unknown signals and for analyzing signals without need for knowledge of the radio specification. These features of the FIG. 1 analysis are important in research and in the development of new radios.

In FIG. 2, one embodiment of a receiver 302 within the front end 29 of FIG. 1 receives the input signal from radio 1 through a direct-wired connection 25 from a wired-output of the radio 1. In FIG. 2, the input signal is collected by a direct-wired connection. The direct-wired connection 25 avoids transmission through an air interface which typically has noise, interfering signals and other unwanted transmissions. When hard wired to the radio 1, as indicated in FIG. 2, the input signal level will likely need to be reduced and hence the attenuator 26 is provided when needed. If the received input signal is within the proper amplitude range, the attenuator 26 can be eliminated.

In FIG. 3, another embodiment of a receiver 303 within the front end 29 of FIG. 1, receives the input signal from radio 1 through a receiving antenna 3. In FIG. 3, the input signal is collected by an antenna. The receiving antenna 3 captures the radio frequency signal transmitted through the air interface by antenna 2 of radio 1. When transmitted through the air interface by the radio 1 as in FIG. 3, the input signal will likely require amplification by amplifier 4. However, if the received input signal is within the proper amplitude range, the amplifier 4 can be eliminated.

In FIG. 4, one embodiment of the front end 29 of FIG. 1 is shown. The front end 29 of FIG. 4 includes a receiver 30 that typically is like either of the receivers in FIG. 2 and FIG. 3. The radio frequency input signal from the receiver 30 is down converted, when necessary, by the radio frequency to intermediate frequency converter, RF/IF 5, to provide an input to the A/D converter 6. After down conversion in RF/IF 5, when required, the resulting converted signal is digitized in A/D converter 6 to form a digitized signal. The sample rate of the A/D converter 6 generally must be at least twice the highest frequency of the frequency hopped signal with enough bits of resolution to provide a dynamic range that permits analysis. With a direct-wired connection as shown in FIG. 3, 8 bits of resolution are sufficient. Using antennas that are subject to environmental interference signals and noise, at least 12 bits of resolution are preferred. The digitized signal is stored in the memory 8 where it becomes available for processing by the digital signal processor 24.

Figure 13:
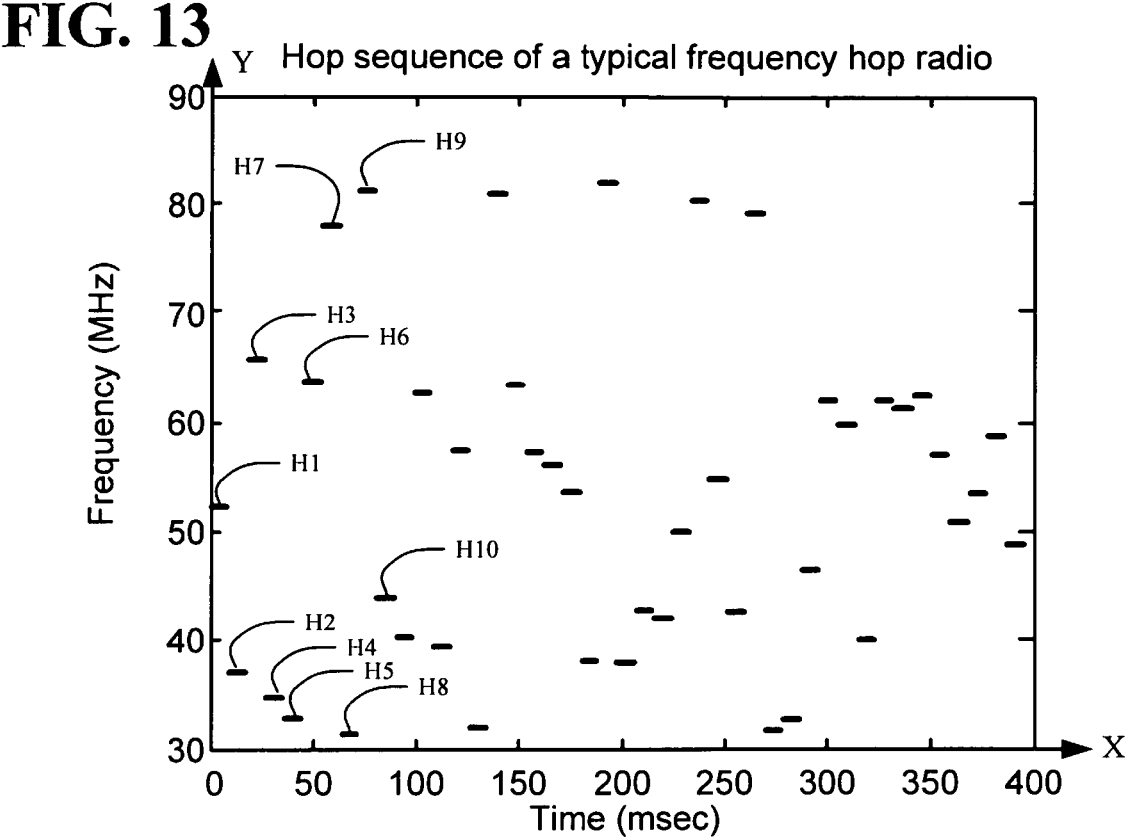
FIG. 13 is a representation of a typical hop sequence showing frequency vs. time.

A typical frequency hopping sequence that represents the input signal from the radio 1 that is to be analyzed is shown in FIG. 13. The signal of FIG. 13 shows the signal time on the X axis and the signal frequency on the Y axis. The hopping sequence for the first ten hops in FIG. 13 is indicated in the following TABLE 1 as H1, H2, . . . , H10. For clarity, FIG. 13 does not represent the amplitude of the signals at the different hop frequencies.

TABLE 1

| HOP | $f_c$ (MHz) |
|---|---|
| H1 | 52 |
| H2 | 38 |
| H3 | 67 |

TABLE 1-continued

| HOP | $f_c$ (MHz) |
|---|---|
| H4 | 34 |
| H5 | 32 |
| H6 | 64 |
| H7 | 79 |
| H8 | 31 |
| H9 | 81 |
| H10 | 44 |

Figure 14:
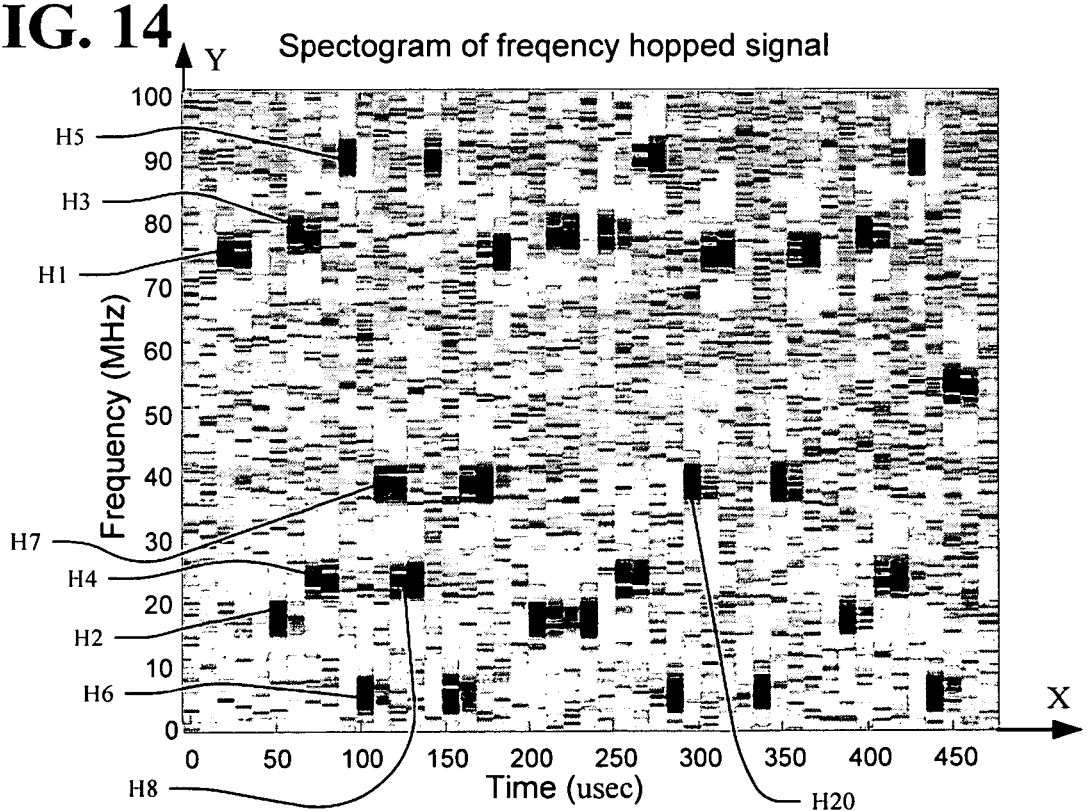
FIG. 14 is a spectrogram of a typical hop sequence showing frequency vs. time with signal power indicated by image intensity.

Another typical frequency hopping sequence that represents an input signal from radio 1, the device under test is shown in FIG. 14. The signal of FIG. 14 shows the signal time on the X axis and the signal frequency on the Y axis and the signal power in the image intensity. The signal of FIG. 14 is unique in that the hop bandwidth is greater than the channel frequencies. The hopping sequence for the first twenty hops in FIG. 14 is indicated in the following TABLE 2 as H1, H2, . . . , H20.

TABLE 2

| HOP | $f_c$ (MHz) |
|---|---|
| 1 | 75 |
| 2 | 18 |
| 3 | 78 |
| 4 | 24 |
| 5 | 90 |
| 6 | 6 |
| 7 | 39 |
| 8 | 24 |
| 9 | 90 |
| 10 | 6 |
| 11 | 39 |
| 12 | 75 |
| 13 | 18 |
| 14 | 78 |
| 15 | 18 |
| 16 | 78 |
| 17 | 24 |
| 18 | 90 |
| 19 | 6 |
| 20 | 39 |

If the input signal is transmitted at a low radio frequency, the RF/IF converter 5 is not necessary. For example, if the highest frequency of the input signal is 30 MHz, the received signal may be sampled directly with a sample rate of 60 Msamples/second or higher to obey the Nyquist criteria. Similarly, alias sampling can be used for signals near the sample rate. For example, if the input signal is from 110-125 MHz, the input signal can be sampled at 100 Msamples/second to create a digitized signal on the output of the A/D converter 6 of FIG. 4 from 10-25 MHz.

The digitized signal on output 7 in FIG. 4 is processed by the digital signal processor 24. This digital signal processor can be a real-time system with high speed processors such as DSP (Digital Signal Processing) chips, FPGAs (Field Programmable Gate Arrays) or general purpose computers. In such cases, the signal memory 8 is typically a FIFO (First In First Out) buffer that provides the digitized data as an input to the digital signal processor 24. In another less costly embodiment, the entire signal to be analyzed and post processed is digitized into a large embodiment of memory 8, typically a disk drive, and analyzed later using a general purpose computer as the signal processor 24.

In FIG. 4, when desired, reference signal parameters, from a specification for a radio 1 under test, are stored in reference store 28 connected with an input to the digital signal processor 24. The digital signal processor 24 compares the reference signal parameters from reference store 28 with the calculated signal parameters processed in to the digital signal processor 24 to determine how the radio under test meets or differs from the specification.

In FIG. 4, when desired, reference signal parameters, from a specification for a radio 1 under test, are stored in reference store 28 connected with an input to the Parameter Value Comparator 86. Digital signal processor (DSP) 24 outputs the measured parameter values to be compared against the specification values in store 28 to form a report 87 on the compliance of the radio under test.

In FIG. 5, the digital signal processing 245 includes the processing steps performed on digitized data from the input signal as stored in the memory 8 in front end unit 29 of FIG. 4. Those signal processing steps produce signal parameters and demodulated symbols and bits.

In FIG. 5, the AMPLITUDE component 24-1 determines the amplitude of the input signal appearing on the output 7 from the front end unit 29 of FIG. 4 using the amplitude measurement block 9. Various algorithms may be used in measurement block 9 to measure the amplitude of the input signal. One efficient algorithm takes the absolute value of the digitized signal on the output 7. The threshold detector 10 functions between hops to detect a burst by detecting the first sample that exceeds the threshold. At this point, the threshold detector 10 is disabled or ignored until the signal analysis indicates the burst has stopped.

In parallel with AMPLITUDE component 24-1, the FREQUENCY component 24-2 determines the frequency of the input signal appearing on the output 7 from the front end unit 29 of FIG. 4. The frequency, $f_c$, is measured in the frequency estimation block 11 and appears at output 13. The frequency estimation block 11 also estimates the bandwidth, BW, and that estimate appears at output 17. The measurements in frequency estimation block 11 will be in error when the signal level of the input signal appearing on output 7 is too low. When the signal level exceeds a threshold established by the threshold unit 10 the frequency estimate on output 13 is valid and is then used as the carrier frequency in the down conversion process 15. If information is known about the channel frequencies of the input signal, in one embodiment, the frequency estimate 13 is rounded to the nearest channel center and the bandwidth 17 is set to the known bandwidth.

Various algorithms can be used to determine the frequency estimate at output 13. Spectral analysis using a Fast Fourier Transform, FFT, or similar algorithm, is a robust embodiment that uses substantial processing power and requires substantial time to execute. Spectral analysis is preferred when the transmitted signal is received via antennas as shown in FIG. 3. With the antenna embodiment of FIG. 3, other signals and noise will be intercepted along with the signal from the radio 1. For example, there are a set of military radios that hop from 30-88 MHz. The higher part of this band overlaps with the lower TV channels. By using spectral analysis in the frequency estimation block 11, the TV and other unwanted signals can be ignored. Spectral analysis is also advantageous when the signal bandwidth is to be estimated.

Figure 6:
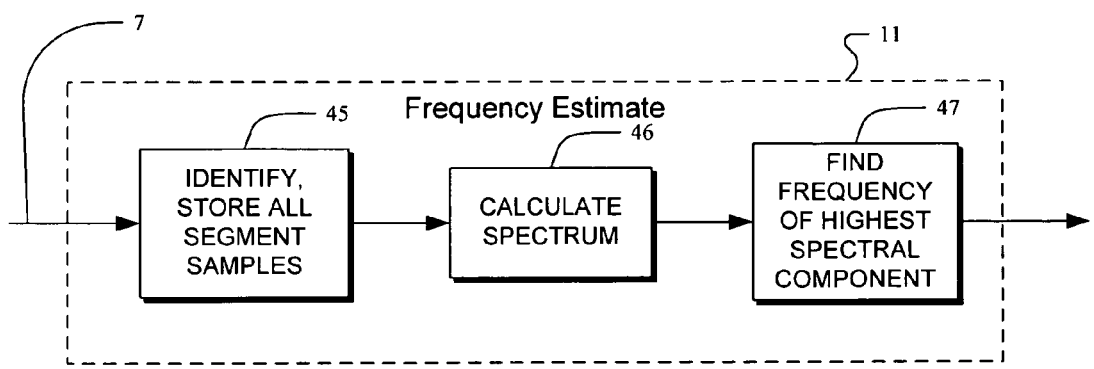
FIG. 6 is a high level diagram of the digital signal processing used in the preferred embodiment to calculate the carrier frequency of the signal segment.

One preferred embodiment the frequency estimation block 11 uses the algorithm outlined in FIG. 6 and detailed in FIG. 7 and FIG. 8. FIG. 6 represents the digital signal processing used in the preferred embodiment to calculate the carrier frequency, $f_c$, of each signal segment. FIG. 7 shows the digital signal processing used to identify the samples associated with the signal segment and to calculate the power spectrum of the segment. FIG. 8 represents the digital signal processing used to calculate the carrier frequency and the bandwidth of the segment.

Referring to FIG. 6, the digitized signal at 7 is processed by the frequency estimation block 11. The first step is to isolate each signal segment, in block 45, as it comes in and calculate the carrier frequency of the segment, in blocks 46 and 47.

Referring to FIG. 7, the absolute value, in block 30, of the input signal 7 is calculated on each sample and stored in a buffer memory 31. When 100 samples are collected, the maximum value is determined in block 32. If this value is greater than a threshold, determined in block 34, the signal is considered active and the samples at 35, corresponding to the 100 absolute value samples stored in buffer memory 31, are stored in a memory 36 which is large enough to accumulate all samples associated with the signal segment. Once stored in memory 36, the system starts to collect the next 100 samples in buffer memory 31.

When the max value in the 100 sample buffer memory 31 drops below the threshold determined in block 34, the signal estimator 46 is commanded at 37 to calculate the power spectrum on all samples in memory 36. This calculation is done via a windowed digital Fourier transform, DFT in block 38. One preferred embodiment uses a Hamming window; however, other windows also work well. If memory 36 contains N signals, an N point Hamming window is calculated and multiplied with the signal on a sample by sample basis. The N point DFT of the windowed signal is calculated. A subset of the output DFT bins is processed to determine the strongest signal. The subset is bins from 5 to N/2−5. The first few bins near DC do not contain signal energy of interest and are ignored. Samples from N/2 to N−1 are the complex conjugate of samples from 0 to N/2−1 and are ignored as their power spectrum is redundant. Samples from N/2−5 to N/2−1 are ignored because they contain no useful signal energy. If the signal band is known, just the bins associated with this band can be processed to save processing time and to ignore unwanted signals.

The DFT is used instead of an FFT algorithm so the present system can use all of the samples associated with the segment. The signal frequency accuracy is a function of the time duration of the samples in the DFT. Rounding the number of samples, N, to the nearest FFT size would exclude some samples reducing the measurement accuracy. Alternatively, the N samples can be padded with zeros to bring the buffer length to the nearest FFT size greater than N.

The power spectrum 40 of the bin subset is calculated by taking the magnitude squared 39 of the complex DFT output bins as shown in Eq 1. When the time samples in memory 36 have been processed, the memory is reset to start compiling the next segment.

$$P(n) = \sqrt{\mathrm{real}\{\mathrm{bin}(n)\}^2 + \mathrm{imag}\{\mathrm{bin}(n)\}^2}, \quad 5 < n < N/2 - 5 \qquad \mathrm{Eq\ 1}$$

The power spectrum bins at 40, P(n), are processed in block 47 to find the frequency at output 13 and bandwidth at output 17 of the strongest peak in the spectrum. The first step in block 50 is to find the bin number, $n_{MAX}$, on output 51 and magnitude on output 52 of the strongest bin, $P_{MAX}$, in P(n) input at 40. The bins below and above $n_{MAX}$ are examined in block 53 to identify all consecutive bins that have sufficient energy. This examination is done by finding all bins that exceed a threshold based on the $P_{MAX}$. A typical threshold is to identify all bins exceeding X dB below the max bin. The first bin exceeding the threshold is $n_{LOW}$ and the last bin exceeding the threshold is $n_{HIGH}$. A typical value of X is around 30 dB. Eq 2 shows the threshold calculation.

$$\text{Threshold}=10^{(-X/10)} * P_{MAX} \qquad \text{Eq 2}$$

The bins associated with the strongest signal, $n_{LOW}$ through $n_{HIGH}$, are processed to determine the signal frequency at output 13 and bandwidth at output 17. The signal frequency is estimated with a center of mass algorithm in block 54 as shown in Eq 3. The signal power is the value of the denominator of Eq 3.

$$fc = \frac{\sum_{n=n_{LOW}}^{n_{HIGH}} \frac{n * fs}{N} P(n)}{\sum_{n=n_{LOW}}^{n_{HIGH}} P(n)} \qquad \text{Eq 3}$$

where:
$f_c$=carrier frequency 13 (cycles/second)
$f_s$=sample rate (samples/second)
$n_{LOW}$=first bin associated with the signal segment
$n_{HIGH}$=last bin associated with the signal segment
N=Number of samples used in the DFT
P(n)=Power spectrum bins 40
The signal bandwidth, BW, 17 is calculated with Eq 4.

$$BW=(n_{HIGH}-n_{LOW}+1)*f_s/N \qquad \text{Eq 4}$$

Alternatively, the bandwidth output at 17 can be calculated as bandwidth containing a given percentage of the total signal energy. The total signal energy is calculated by summing all bins about the peak bin, this would typically involve bins outside the bins from $n_{LOW}$ and $n_{HIGH}$. For example, if the desired bandwidth value is to be that containing 98% of the signal energy, the bins below the peak bin will be summed to identify the bandwidth containing 49% of the total energy. Similarly, the bins above the peak bin are summed to identify the bandwidth containing 49% of the total energy. The upper and lower bandwidths are summed to produce the total bandwidth.

When the transmitter of radio 1 is wired to the present system as shown in FIG. 2, the received signal is free from interference signals from the environment. In this case, a simpler algorithm such as FM demodulation can be used to determine the carrier frequency. This technique can not measure the signal bandwidth.

In FIG. 5, delay memory 12 is used to give the frequency estimation enough signal duration to obtain a reliable estimate so the entire burst can be analyzed without losing the beginning of the signal.

The down converter block 15 multiplies the digitized signal by a digital local oscillator to down convert the signal to baseband using Eq 5. The resultant digital signal at 18 is a complex signal.

$$y_{BB}(k)=y_{IF}(k)*[\cos(2\pi f_c k/f_s)-j \sin(2\pi f_c k/f_s)] \qquad \text{Eq 5}$$

where
k=sample number: 0, 1, 2, . . .
$y_{IF}(k)$=k'th sample from memory 8
$y_{BB}(k)$=k'th complex output down converted sample
$f_c$=carrier frequency 13 (cycles/second)
$f_s$=sample rate (samples/second)
The resultant signal at 18 will have one component around 0 Hz and an undesired component centered around $-2 f_c$. The undesired component will be reduced to an acceptable level by lowpass filter 16. The filter 16 will also decimate the sample rate by M where only the M'th output filtered values are calculated by the filter 16. For example, in the case of Bluetooth, the hop frequency band covers 83.5 MHz. This band can be digitized with a 200 Msample/second sample rate. The individual hop channels are 1 MHz wide. It is reasonable to reduce the resultant complex sample rate of the baseband signal at 18 from 200 Msamples/second to around 1.25 M complex samples/second. In this case, the decimation factor M is 200/1.25=160. The low pass digital filter is either an FIR or IIR filter with bandwidth BW as determined at 17.

The baseband signal at 18 is processed to measure many of the signal parameters. The first step in the processing is to demodulate the data. The signal can be AM demodulated as shown in Eq 6, however, other algorithms can be used to generate the AM signal 20.

$$AM(n)=\text{sqrt}[\text{real}\{y_D(n)\}^2+\text{imag}\{y_D(n)\}^2] \qquad \text{Eq 6}$$

where
n=sample number of the decimated samples: 0, 1, 2, . . .
$y_D(n)$=decimated, filtered baseband complex time samples
AM(n)=amplitude waveform 20 of the filtered signal
real=extracts the real part of the complex signal
imag=extracts the imaginary part of the complex signal
Other parameters may require the phase demodulated signal. The phase demodulated signal can be generated with Eq 7; however, other algorithms can be used to generate the phase demodulated signal at output 21.

$$PM(n)=\text{atan 2}(\text{real}\{y_D(n)\}, \text{imag}\{y_D(n)\}) \qquad \text{Eq 7}$$

Where
n=sample number of the decimated samples: 0, 1, 2, . . .
$y_D(n)$=decimated, filtered baseband complex time samples
PM(n)=phase waveform 21 of the filtered signal
real=extracts the real part of the complex signal
imag=extracts the imaginary part of the complex signal
atan 2=four quadrant arc tangent function of atan (imag$\{y_D(n)\}$/real $\{y_D(n)\}$)
Other parameters still may require the frequency demodulated signal at output 22. The frequency demodulated signal may be generated with Eq 8, however, other algorithms can be used to generate the FM signal.

$$FM(n)=(f_{sD}/2\pi)(PM(n)-PM(n-1)) \qquad \text{Eq 8}$$

Where
n=sample number of the decimated samples: 0, 1, 2, . . .
PM(n)=phase waveform 21 of the filtered signal
FM(n)=frequency waveform 22 of the filtered signal (cycles/second)
$f_{sD}$=decimated sample rate (samples/second)=$f_s$/M
Since the FM signal at 22 is derived from the derivative of the PM signal at 21, any high frequency noise in the PM signal at 21 will be magnified in the FM signal at 22. It is common to low pass filter the PM signal to reduce the high frequency noise. It is also common to low pass filter the AM signal at 20 and FM signal at 22 to allow more accurate measurements to be made. The mean value of the FM output at 22 can be used to refine the frequency estimate 13 to produce a more accurate reporting of the hop frequency.

The results of the present system are created in the signal analysis block 23. The AM signal 20 is used to calculate the rise time of the burst. This calculation is typically done by finding the average amplitude in the center 50% of the burst as a reference level and finding the time where the AM waveform at 20 is 10% and 90% of this reference amplitude.

The rise time is the difference between the 90% and 10% times. Interpolation is used to measure the 10 and 90% times accurately. The 90% to 10% fall time at the end of the burst is similarly measured.

Some signals do not turn completely off between bursts; the AM waveform at 20 can be used to measure this amplitude. The amplitude of some signals can come up to a low level for a short period before the burst is judged to turn on, the AM waveform can be used to measure this amplitude and duration.

The AM waveform at 20 can also be used to measure the amplitude ripple magnitude and frequency across the duration of the burst.

If the signal is an AM or ASK signal, the AM waveform at 20 is used to determine the signal symbol rate, symbol rate drift, modulation depth, jitter, the symbols and other parameters.

If the signal is PSK, the PM waveform at 21 is used to measure the modulation–degrees per symbol state. For example a QPSK signal changes 90 degrees per symbol state. The PM waveform can be used to measure the signal symbol rate, symbol rate drift, modulation depth, jitter, phase accuracy, the symbols and other parameters.

If the signal is FSK, the FM waveform at 22 is used to measure the frequency deviation of the symbol states. The FM waveform is used to measure the signal symbol rate, symbol rate drift, modulation depth, jitter, phase accuracy, the symbols and other parameters.

The symbol rate is a key parameter to all digital signals. Various algorithms can be used to calculate the symbol rate including spectral analysis, correlation and time of transition (TOT) analysis. It is desired to calculate the bit rate independently on each signal segment. TOT analysis is selected as being the most accurate with the short amount of data available in the signal segment. The algorithm that follows is for an FSK signal, however, it is easily adapted for ASK and PSK signals.

Figure 9:
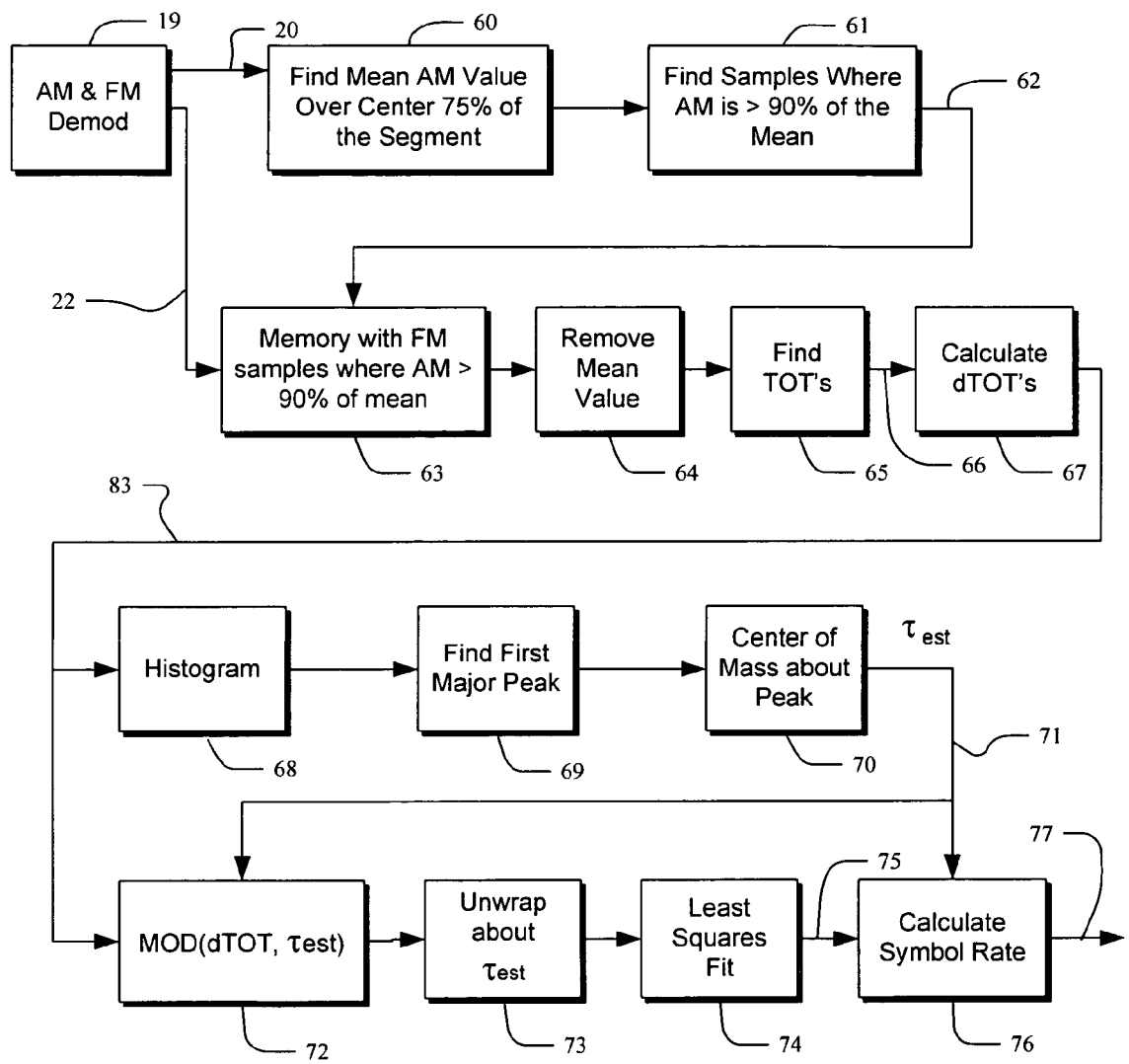
FIG. 9 is a block diagram of the digital signal processing algorithm used to calculate the signal symbol rate.

FIG. 9 shows the algorithm used to calculate the symbol rate on an FSK signal at 22. The first step in block 60 is to analyze the AM signal at 20 to determine the mean amplitude over the center 75% of the center of the segment. The sample numbers at 62 are identified where the AM signal for the segment exceeds 90% of the mean value. The FM samples associated with these AM sample numbers are stored in memory 63 for processing.

The next step 64 is to remove the mean value of the FM samples. Next the times of each zero crossing 66, TOT, are calculated in block 65 by interpolating the time of the samples on either side of the zero crossing. The first difference at 83 of the TOTs are calculated in block 67: dTOT (k)=TOT(k)–TOT(k–1) for all TOTs in the burst.

Figure 15:
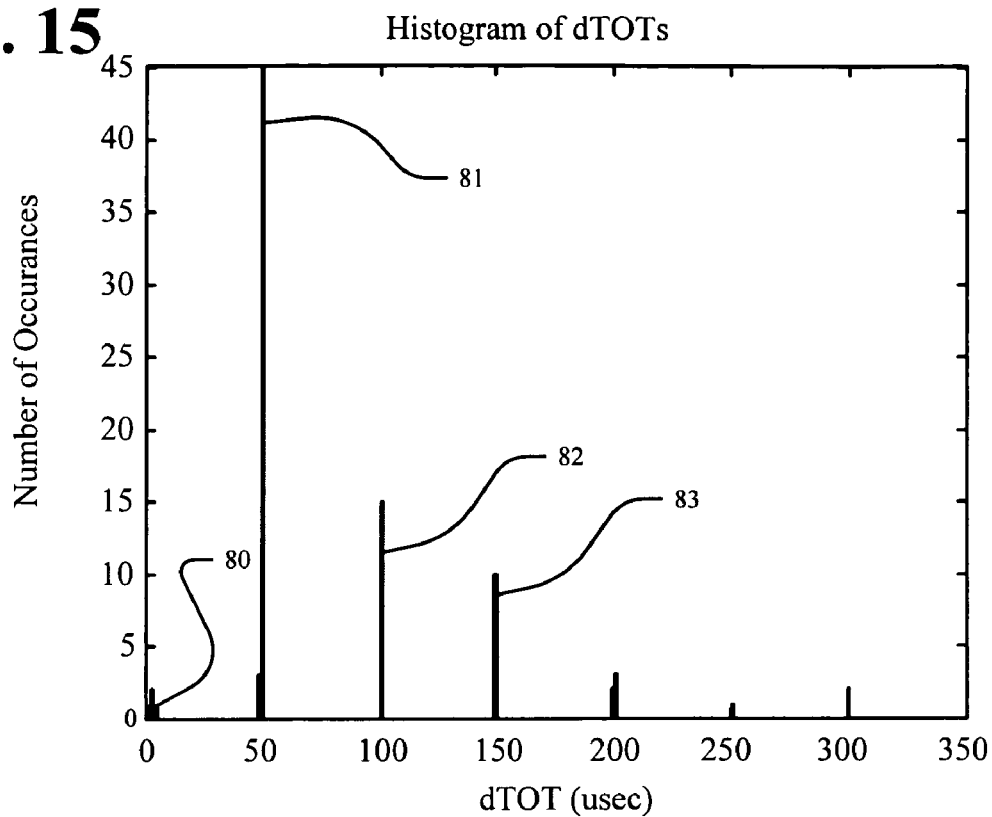
FIG. 15 depicts a histogram of dTOT values as compiled and analyzed to show the first major peak and following peaks.
Figure 16:
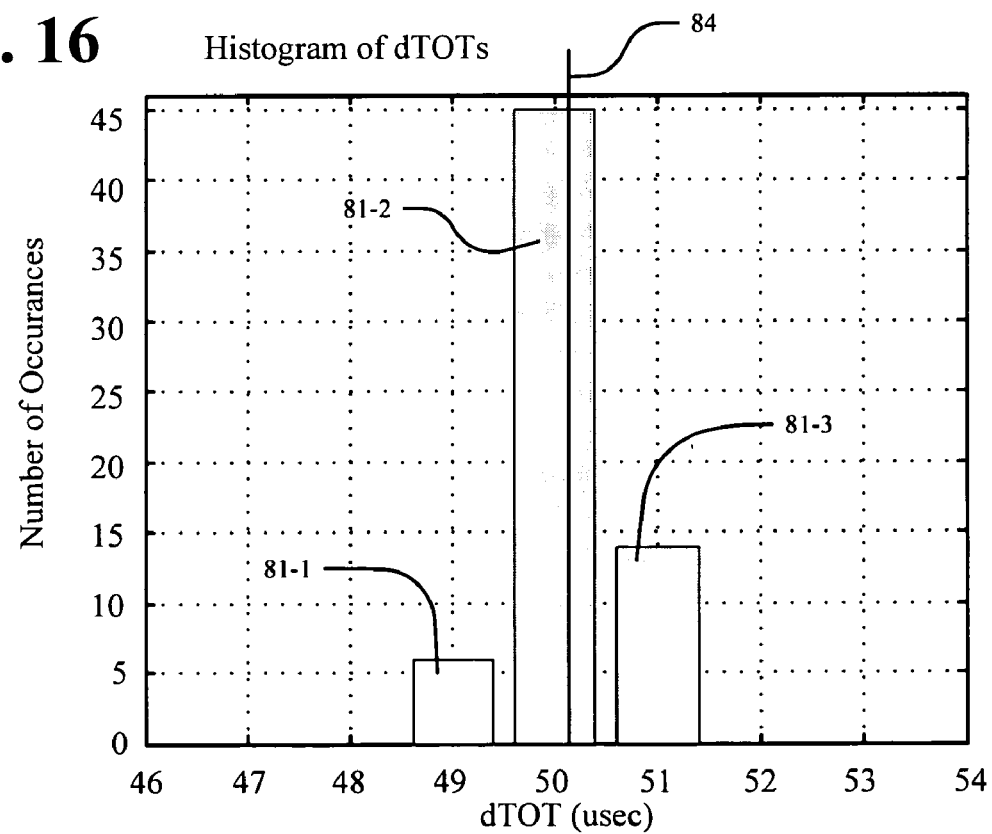
FIG. 16 shows an expansion of the first major peak of FIG. 15 with three bins used to find the center of mass of the histogram.

A histogram of the dTOT values is compiled at 68 and analyzed to find the first major peak 81, $b_{MAX}$ in block 69. FIG. 15 shows an example of this histogram. There may be stray zero crossings with very short TOT in noisy data that is to be ignored 80. Harmonic peaks will be present at 2×82, 3×83, etc. of the fundamental symbol period due to double, triple, etc symbols with the same symbol value. FIG. 16 shows an expansion of the first major peak 81 with bins 81-1, 81-2 and 81-3 at dTOT=49, 50 and 51. The center of mass 84 of the histogram will be the estimate in block 70 of the symbol rate, $\tau_{est}$, at 71. This estimate is calculated using histograms from about 0.9*$b_{MAX}$ to 1.1*$b_{MAX}$ which are calculated as shown in Eq 9. In the example of FIG. 16, the center of mass 84 is (6×49+45×50+14×51)/(6+45+14) =50.12 usec.

$$\tau_{est} = dBin \frac{\sum_{b=.9b_{MAX}}^{1.1b_{MAX}} bHist(b)}{\sum_{b=.9b_{MAX}}^{1.1b_{MAX}} Hist(b)}$$  Eq 9 where:
dBin=histogram bin width (seconds)
Hist(b)=histogram array with bins b
$b_{MAX}$=bin number of first major histogram peak
$\tau_{est}$=estimated symbol period (seconds)

The modulo of the dTOT values at 83 and the estimated symbol rate, $\tau_{est}$, at 71 is calculated in block 72 to remove the double, triple, etc symbols from the dTOT values. An unwrap algorithm is used to correct for +/–$\tau_{est}$ errors as shown in the Matlab code of TABLE 2 below. This unwrap algorithm is used if the symbol rate estimate is in error enough so the mod(dTOT) values drift beyond $\tau_{est}$.

TABLE 2

| Code | Comment |
| --- | --- |
| correction = 0; | % wrap correction factor |
| for k = 2:nTOTs; | % process all TOTs |
|   dTOT = TOT(k) – TOT(k–1); | % calculate the first difference |
|   mod_dTOT = mod(dTOT, tauEst); | % calculate the modulo with the symbol rate estimate |
|   if mod_dTOT – lastMod_dTOT > tauEst/2; | % value took too high a step indicating wrap around |
|     correction = correction + tauEst; | % |
|   end | % |
|   if mod_dTOT – lastMod_dTOT < –tauEst/2; | % value took too high a step indicating wrap around |
|     correction = correction – tauEst; | % |
|   end; | % |
|   mod_dTOT = mod_dTOT – correction; | % |
| end; | % |

The resultant mod_dTOT values are fitted to a straight line with a least squares fit 74. The resultant slope 75, m, is used 76 to produce the final symbol rate measurement 77 as shown in Eq 10.

$$\tau_{SYM} = \tau_{est}(1+m)$$  Eq 10

Figure 10:
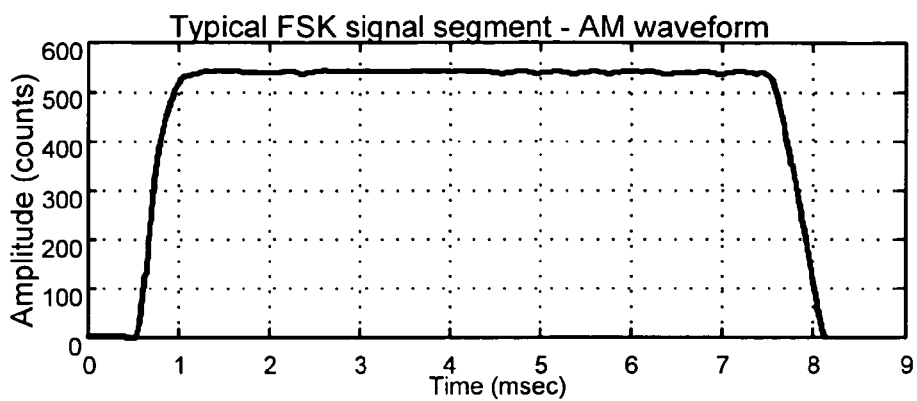
FIG. 10 is a typical AM waveform for an FSK signal segment.
Figure 11:
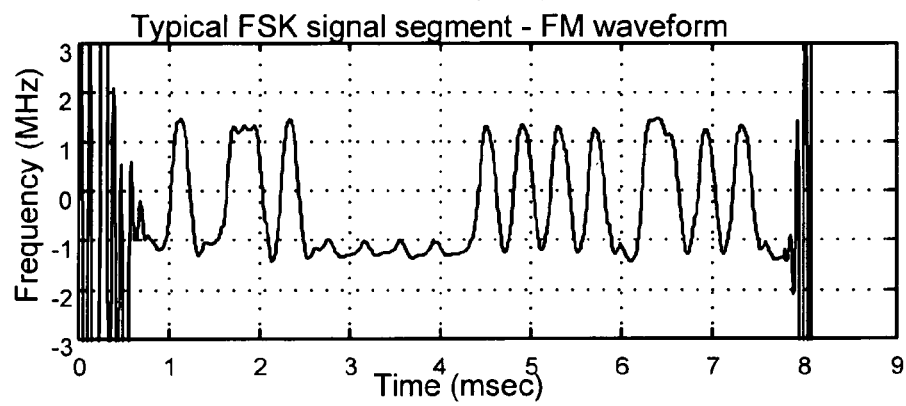
FIG. 11 is a typical FM waveform for an FSK signal segment
Figure 12:
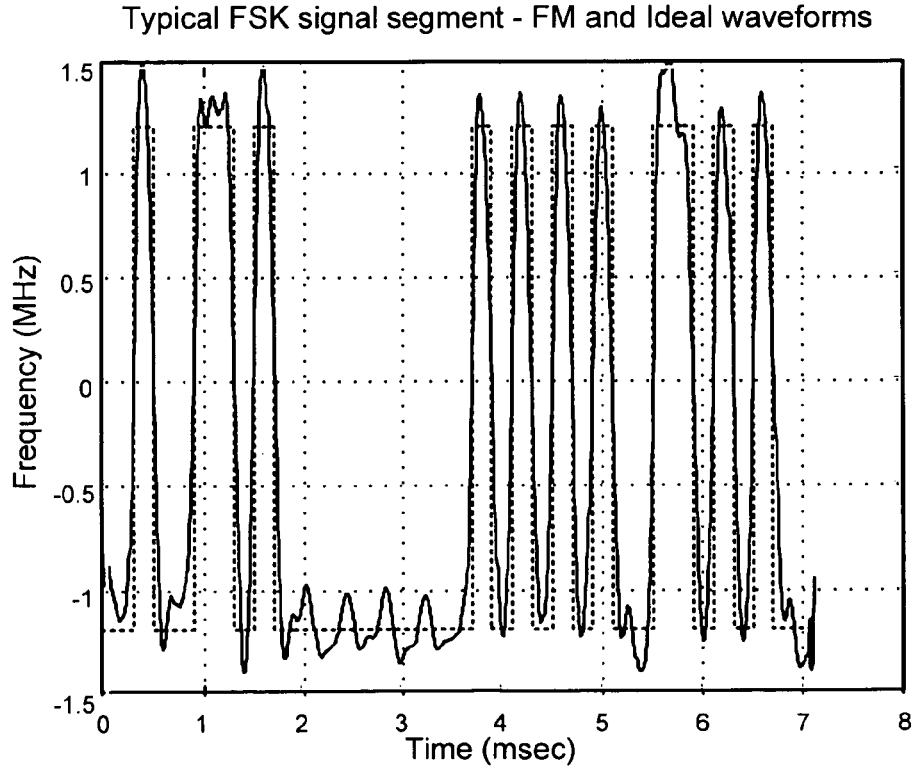
FIG. 12 is a typical FM waveform and the idealized representation of the waveform.

The symbol rate is reported to the user. The symbol rate is also used to decode the individual symbol values and to determine the symbol rate jitter statistics. The first step in this process is to reconstruct the ideal waveform from the signal. A typical result is shown in FIG. 12 with the FM waveform (shown solid) and the ideal waveform (shown dashed) superimposed, this is the same signal shown in FIG. 10 representing the FM samples in memory 63. The data shown in FIG. 11, FIG. 11 and FIG. 12 are the AM and FM demodulated data of the first signal hop H1 shown in FIG. 13. The spectrogram analysis shown in FIG. 13 and FIG. 14 are good for overall visual analysis, however, they lack the time and frequency resolution for detailed signal analysis. The ideal waveform is calculated to have the same modulation depth, mean FSK mark and space frequency offsets in this case, the symbol rate at 77 and is synchronized in time to the FSK waveform at 22 (see FIG. 5). The jitter is the error between the TOT from the FM waveform and that from the ideal, calculated waveform.

The raw digitized data at 7 are processed by the signal analyzer to determine the spurs, harmonics and unwanted signals in the signal band. This processing is accomplished by computing the spectrum of the signal and calculating the power and frequency of each signal exceeding a threshold. The threshold is usually x dB below the power level of the hop. The spurs and harmonics are calculated for each hop. The spur frequency is calculated by the center of mass algorithm presented in Eq 3 where $n_{LOW}$ and $n_{HIGH}$ are bin values about the bin identified as a spur. The spur power is the denominator of Eq 3.

While the invention has been particularly shown and described with reference to preferred embodiments thereof it will be understood by those skilled in the art that various changes in form and details may be made therein without departing from the scope of the invention.

The invention claimed is:

1. A method of broadband radio frequency analysis comprising the steps of:
   receiving a frequency hopping radio input signal for broadband analysis, said input signal having segments at different hopping frequencies and different hopping times,
   for each segment,
      determining from the input signal a hopping time of the segment,
      processing the segment to determine a frequency of the segment, and
      processing the segment to determine signal parameters,
   where the signal processing includes signal demodulation to form a demodulated signal and where the signal processing includes measuring a symbol rate where the symbol rate is calculated by analysis of zero crossing times in the demodulated signal,
   where time differences between zero crossings is calculated from zero crossing times,
   where a TOT histogram is compiled of the time differences as delta TOTs,
   where a symbol period estimate of a symbol period is formed from a center of mass of a first major peak in the TOT histogram,
   where the symbol period is calculated by,
      computing the modulo of the delta TOTs and the symbol period estimate,
      unwrapping the modulo results about the symbol period estimate,
      fitting a straight line to the unwrapped data,
      using a slope of the straight line to refine the symbol period estimate thereby producing a final value for the symbol period.

2. The method of claim 1 where the straight line fit uses a least squares fit.

* * * * *